United States Patent [19]

Hashimoto

[11] Patent Number: 5,517,256
[45] Date of Patent: May 14, 1996

[54] RESERVATION CODES TO AUTOMATICALLY CONTROL A TV AND VCR WHEN SET TO EITHER A TV MODE OR A VCR MODE

[75] Inventor: Kazuo Hashimoto, Tokyo, Japan

[73] Assignee: Hashimoto Corporation, Tokyo, Japan

[21] Appl. No.: 233,915

[22] Filed: Apr. 28, 1994

[30] Foreign Application Priority Data

Apr. 28, 1993 [JP] Japan ................................ 5-123251

[51] Int. Cl.⁶ ............................... H04N 5/50; H04N 5/782
[52] U.S. Cl. ........................ 348/731; 348/734; 348/906; 358/335; 360/69; 360/79
[58] Field of Search .................................. 348/734, 731, 348/725, 906; 358/335; 360/69, 79; H04N 5/44, 5/50, 5/76, 5/782

[56] References Cited

U.S. PATENT DOCUMENTS

| | | | |
|---|---|---|---|
| 4,325,081 | 4/1982 | Abe et al. | 358/335 |
| 4,400,735 | 8/1983 | Strammello, Jr. | 348/706 |
| 4,947,263 | 8/1990 | Yun | 358/335 |
| 4,999,622 | 3/1991 | Amano et al. | 348/734 |
| 5,165,069 | 11/1992 | Vitt et al. | 358/335 |
| 5,191,488 | 3/1993 | Hashimoto | 360/60 |
| 5,193,009 | 3/1993 | Park | 358/335 |
| 5,307,173 | 4/1994 | Yuen et al. | 348/731 |
| 5,329,376 | 7/1994 | Kim et al. | 358/335 |
| 5,339,826 | 8/1994 | Schmidt et al. | 128/731 |
| 5,388,161 | 2/1995 | Park | 381/98 |

FOREIGN PATENT DOCUMENTS

| | | | |
|---|---|---|---|
| 63-179676 | 7/1988 | Japan | H04N 5/782 |
| 2191643 | 12/1987 | United Kingdom | H04N 5/44 |
| 2266818 | 10/1993 | United Kingdom | H04N 5/782 |

Primary Examiner—James J. Groody
Assistant Examiner—Cheryl Cohen
Attorney, Agent, or Firm—Lowe, Price, LeBlanc & Becker

[57] ABSTRACT

In a combination television and videocassette recorder device which is automatically controlled by TV program reservation codes, when the selector switch is set to the TV mode side, it is possible to automatically control the television by the reservation codes. On the other hand, when the selector switch is set to the VCR mode side, it is possible to automatically control the videocassette recorder by the reservation codes.

22 Claims, 2 Drawing Sheets

RESERVATION CODES TO AUTOMATICALLY CONTROL A TV AND VCR WHEN SET TO EITHER A TV MODE OR A VCR MODE

BACKGROUND OF THE INVENTION

The present invention relates to a combination television and videocassette recorder device.

Recently, in such countries as tile U.S.A. and Japan, devices utilizing reservation codes, such as Plus Codes or G Codes, have become widespread. It is a simple matter to make TV program recording reservations using these multiple digit reservation codes for controlling VCRs, which are published in newspapers and TV guides. The viewer merely inputs an appropriate reservation code by operating a keypad and the corresponding TV program will be recorded. However, these devices, which could be very useful if applied to other situations such as when tile user does not need to record TV programs on the VCR, have been used exclusively for recording.

SUMMARY OF THE INVENTION

The present invention, by utilizing a method of controlling a VCR by means of tile aforementioned reservation codes, is intended to provide control features which enable the user not only to record a reserved TV program on a VCR, but also to view the reserved TV program on a TV set without actually recording t.

For this reason, the present invention, namely a combination TV and VCR device, is provided with a switch that can select the TV or the VCR. When the switch is set to the TV side, it is possible to view a reserved TV program without actually recording it whether or not a videotape has been loaded into the VCR. When the switch is on the VCR side, it is possible to record on the VCR a TV program which is reserved in accordance with the reservation codes.

Legend

A=Combination VCR and TV device
1=Antenna
2=VCR (videocassette recorder)
3=Tuner
4=Light receiving unit
5=Stop button
6=Power supply
7=Power outlet
8=Output terminal for recording mode detection
9=Video output terminal
10=Analog switch
11=Selector switch
12=AND gate
13=Monitoring television
14=Large sized television
15=Remote control box
16=Light emitting unit
17=Remote control box

DESCRIPTION OF THE PREFERRED EMBODIMENT

Operation of First Embodiment

Figure 1:
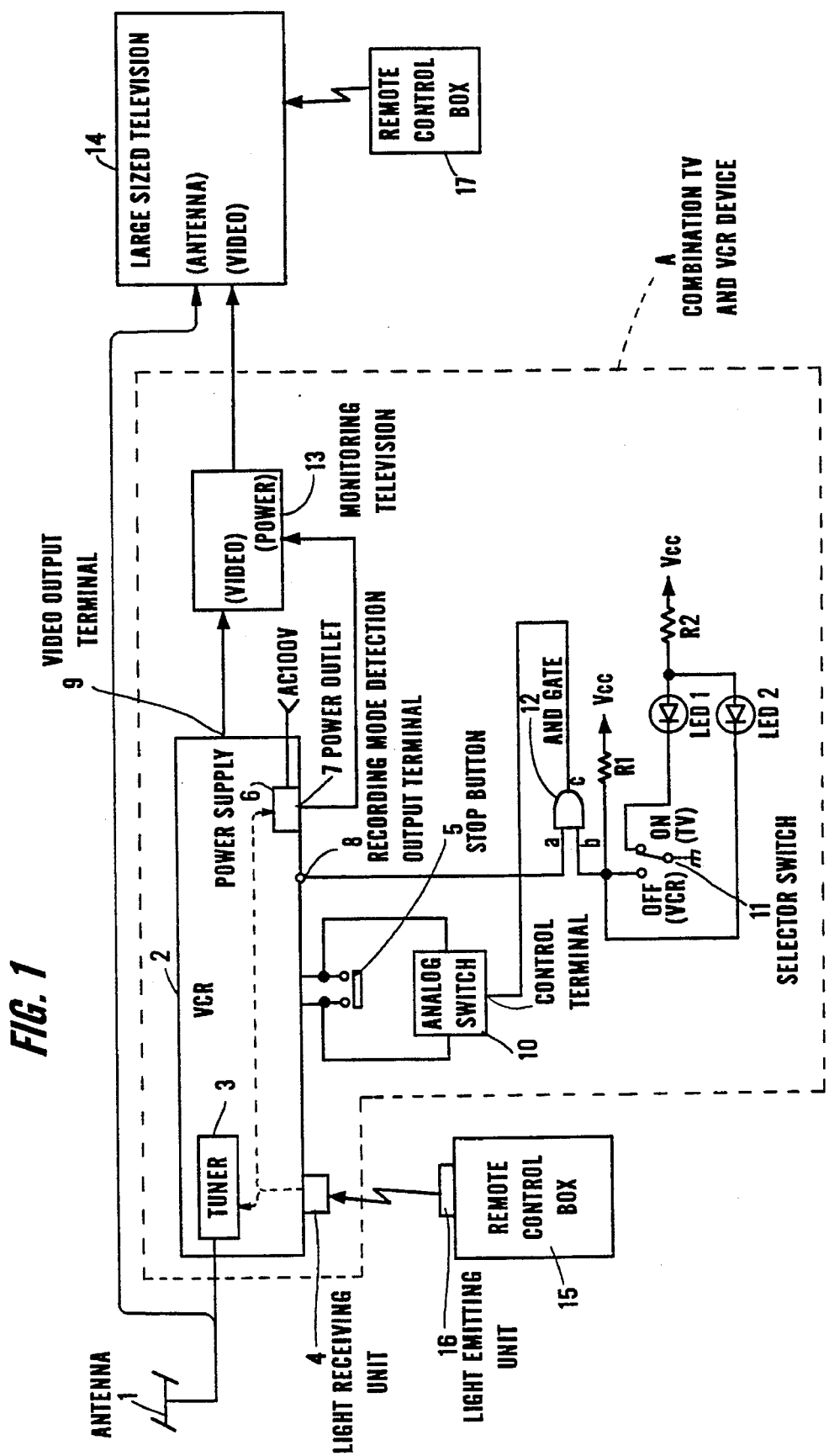
FIG. 1 s a block diagram illustrating a first embodiment of the present invention.

FIG. 1 shows a combination television and VCR device.

In the drawing, Numeral 1 is an antenna. Numeral 2 is a VCR. Numeral 3 is a tuner. Numeral 4 is a light receiving unit which receives encoded infrared rays from remote control box 15. Numeral 5 is a stop button for stopping the traveling of a videotape (not shown). Numeral 6 is a power supply which outputs 100 volts AC when it receives an encoded remote control signal which will be described later. Numeral 7 is a power outlet which will provide 100 volts AC from the aforementioned power supply 6.

Numeral 8 is an output terminal for detecting recording mode. It outputs a high (H) level signal when VCR 2 is set to recording mode. Numeral 9 is a video output terminal. Analog switch 10 is connected so that the terminal of the aforementioned stop button 5 is short-circuited.

Numeral 11 is a selector switch for selecting whether the G Codes are to be used for the TV or for the VCR. This switch may be a manually operated mechanical switch. Or, it may be an electronic switch either controlled by infrared rays from the remote control box or operated by detecting whether or not a videotape is loaded into the VCR which will be described later. A further possibility is to control the switch by software.

Numeral 12 is an AND gate which has terminals "a," "b" and "c." Input terminal "a" is connected to output terminal 8 for recording mode detection. Input terminal "b" is connected to the "OFF" (VCR) contact of selector switch 11. Output terminal "c" is connected to control terminal of the aforementioned analog switch 10.

Accordingly, when selector switch 11 is in the "ON" (TV mode) position and tile aforementioned output terminal 8 for detection of recording mode is at a high level, output terminal "c" becomes high, whereby the aforementioned analog switch 10 turns on.

Numeral 13 is a small television for monitoring purposes. Numeral 14 is a large television. Numeral 15 is a remote control box which can transmit television program reservation codes in accordance with G Codes.

Next, operations are described in detail.
[Television Mode]

When selector switch 11 is switched to the "ON" (TV mode) position, light emitting diode LED-1 lights up and the main power switch (not shown) of VCR 2 is turned off or maintained to be in an off condition.

Next, one or more TV program reservations should be entered into remote control box 15 based on G Codes. These G Codes are published in newspapers and the like.

When it becomes time for one of tile reserved TV programs to be recorded, light emitting unit 16 radiates encoded infrared rays in order to turn on VCR 2's power. When these infrared rays are received at light receiving unit 4, VCR 2's main power source turns on via power supply 6. Then monitoring TV 13 receives an alternating current via power outlet 7, and at the same time the various circuits of VCR 2 will receive a direct current.

Next, light emitting unit 16 radiates encoded infrared rays which are for setting channels. Then the channels of VCR 2's tuner 3 are set. Next, encoded infrared rays for setting VCR 2 to recording mode are emitted.

In order to set VCR 2 to recording mode, signals from one of the output ports (not shown) of a microprocessor (not shown) which is built into VCR 2 are switched from a low level to a high level. The signals from the output port are applied, as recording mode detection output, to input terminal "a" of AND gate 12 via recording mode detection output terminal 8.

Because terminal "b" of AND gate 12 is at a high level by means of resistor R1, output terminal "c" switches from a low level to a high level, thereby turning analog switch 10 on. The internal resistance of analog switch 10 drops, thereby short-circuiting the terminal of stop button 5. This cancels the recording mode of VCR 2 and prevents the videotape (not shown) from traveling.

If there had been no videotape in VCR 2, it would not have been set to recording mode.

In other words, power to VCR 2 is turned on and channels are selected in response to encoded infrared rays from the above-mentioned remote control box, whether or not a videotape had been loaded into the VCR. Therefore, video signal output from tuner 3, whose channels had been set in the above manner, is applied to monitoring television 13 via video output terminal 9 and displayed. (The intermediate circuits have been omitted because they are known art.) It is also possible to connect the video signal to large sized television 14, if necessary.

When the reserved TV program ends (when the recording ends), encoded infrared rays for the purpose of turning off VCR 2 are radiated from light emitting unit 16 which is contained in remote control box 15. Accordingly, power to monitoring television 13 is also turned off via power supply 6.

In the event that a plurality of television program reservations are entered into remote control box 15, the above operations are repeated. It should be noted that in FIG. 1, audio circuits have been omitted.

[VCR Mode]

If selector switch 11 is in the "OFF" (VCR mode) position, it is possible to record as long as a videotape (not shown) is loaded into VCR 2.

Specifically, if selector switch 11 is in the "OFF" position, AND gate 12 is deactivated because terminal "b" of AND gate 12 is connected to ground via the OFF contact. Since this keeps analog switch 10 in an off condition, unlike the last case, there is nothing to prevent the videotape from traveling.

Assuming a TV program reservation had been entered into remote control box 15, an encoded infrared ray s radiated from remote control box 15 upon arrival of tile recording start time. As illustrated above, the infrared ray turns on power to VCR 2, sets the appropriate channel and then activates VCR 2 in recording mode. When recording of the reserved TV program ends, an encoded infrared ray from remote control box 15 turns off power to VCR 2.

If a plurality of television program reservations have been entered into remote control box 15, the above operations are repeated.

It should be noted that present device may have a structure such that when people are not at home, power is not supplied to monitoring television 13. This can be achieved by using encoded infrared rays from remote control box 15.

Also, if people are present, it is possible to display a program being recorded on large television 14 by means of remote control box 17.

It should be noted that the present device may have a structure wherein a button is added to remote control box 15 so that selector switch 11 can be controlled by means of encoded infrared rays.

Operation of Second Embodiment

Figure 2:
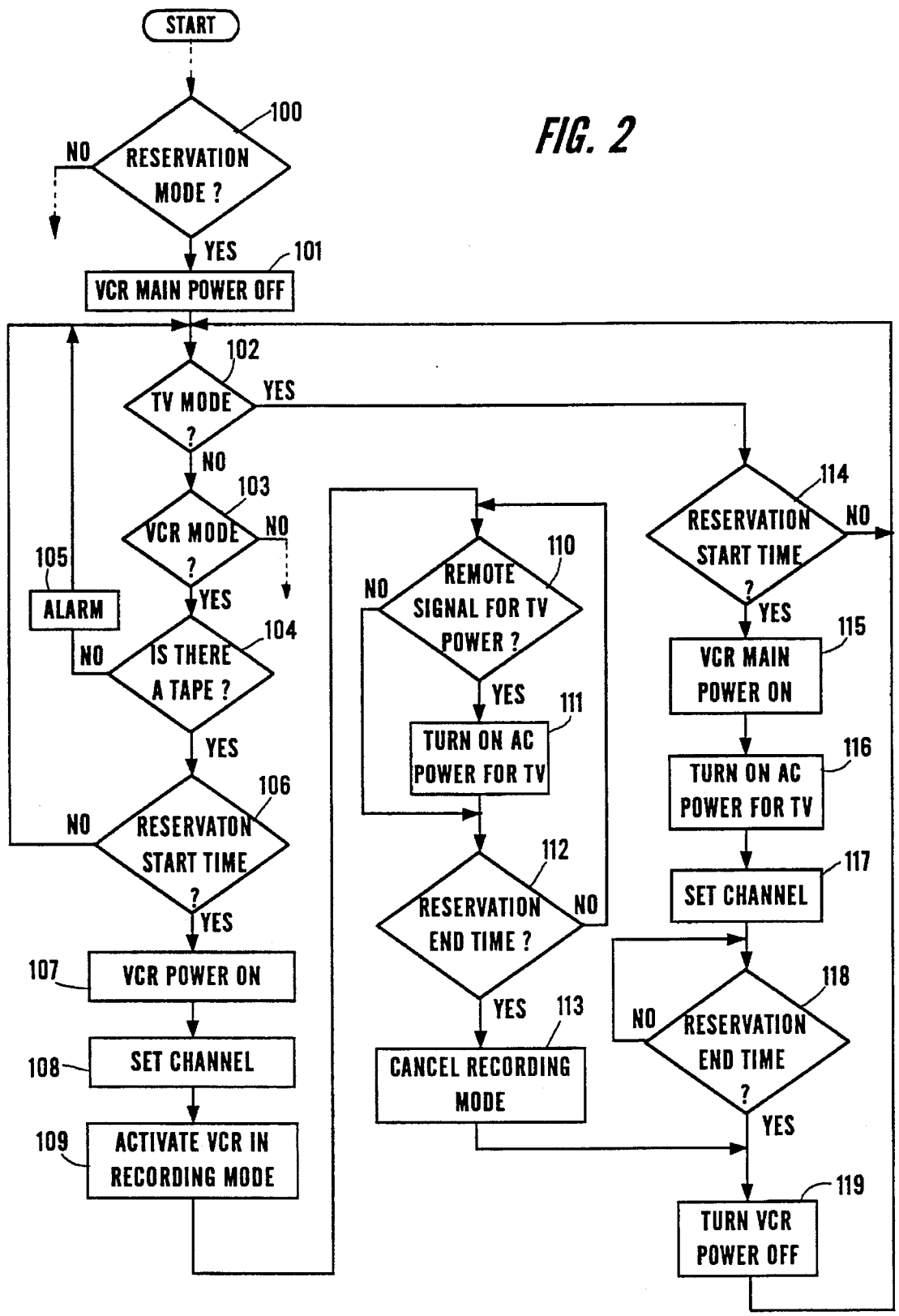
FIG. 2 is a flowchart illustrating a second embodiment of the present invention.

FIG. 2 is a flowchart illustrating a second embodiment of the present invention. The principles of the present invention are applied to a videocassette recorder (VCR 2) which has a built-in G Code controller.

In this VCR 2, components that were described in the first embodiment, such as analog switch 10, mechanical selector switch AND gate 12, resistors R1 and R2, and light emitting diodes LED 1 and LED 2, are not utilized. Instead, the functions of the present invention are achieved by modifying the program in tile microprocessor (not shown) of tile aforementioned VCR 2.

In this embodiment of the present invention, one or more television program reservations are entered into VCR 2 by using the aforementioned remote control box When VCR 2 is set to reservation mode (also known as timer mode), Step 100 becomes affirmative and the main power source to VCR 2 is turned off at Step 101. At the same time, power to monitoring television 13 is turned off. TV mode and VCR mode of Steps 102 and 103 respectively can be set by encoded infrared rays from the aforementioned remote control box

[VCR Mode]

Assuming tile present device is set to VCR mode, Step 103 becomes affirmative. At Step 104, a test takes place to determine whether a videotape (not shown), which is necessary for recording, had been loaded into the VCR.

If a videotape had not been loaded into the VCR, an audible or visual alarm is generated at Step 105.

If a videotape had been loaded into the VCR, Step 104 is affirmative. Then at Step 106, a test takes place to determine whether the starting time for a reserved television program has arrived. If so, Step 106 becomes positive and the main power source to VCR 2 is turned on at Step 107. At Step 108, tile channel is set according to tile aforementioned reservation code. Then, at Step 109, tile VCR is activated in recording mode.

The present embodiment is structured so that in the aforementioned recording mode, power will not be supplied to monitoring television 13. For this reason, Step 110 is negative and Step 111 is consequently bypassed.

However, if viewers would like to see what is being recorded, they may turn monitoring television 13 on by issuing a command from remote control box 15. Doing so causes Step 110 to become positive, and at Step 111, AC power at power outlet 7 for monitoring television 13 is turned on.

When the ending time for the reservation arrives, Step 112 becomes affirmative, and at Step 113 recording mode is cancelled. At Step 119, the main power source to the VCR is turned off and control returns to Step 102.

[Television Mode]

Assuming VCR 2 had been switched to TV mode, Step 102 is affirmative. When the starting time for u reservation arrives, Step 114 becomes affirmative. (As will be explained below, actual recording does not take place) Then, tile main power source to VCR 2 is turned on at Step 115. AC power is supplied to monitoring television 13 at Step 116, and channel setting takes place at Step 117.

In tile aforementioned steps and the following steps as well, recording does not occur because the videotape (not shown) is not activated to travel.

In other words, it does not matter whether or not a videotape had been loaded into VCR 2. By means of the aforementioned Steps 115 through 117, the reserved program is shown on monitoring television 13. When the end of the reservation is reached at Step 118, power to the VCR is turned off at Step 119, and control returns to Step 102. At this time, AC power to monitoring television 13 is also turned off.

In the case where a plurality of reservation codes have been entered into the VCR, the above operations are repeated.

In tile first embodiment of tile present invention, selector switch 11 is manually operated to switch between VCR mode and TV mode. However, it should be noted that there are now VCRs on the market which provide a "cassette switch" (not shown) for detecting whether or not a videocassette has been loaded into the VCR. By providing an electronic selector switch (not shown) that is activated in conjunction with this "cassette switch," the present device may be structured to operate in VCR mode when a videocassette has been loaded into the VCR and to operate in TV mode when no videocassette has been loaded into the VCR.

As shown above, when the selector switch is set to the TV mode side, it is possible to view on a TV set a TV program which had been reserved by a reservation code such as a G Code whether or not a videotape has been loaded into the VCR. On the other hand, when the aforementioned selector switch is set to the VCR mode side, it is possible to record on the VCR a TV program which was reserved using the aforementioned reservation code and, if necessary, monitor the program which is being recorded on a TV. Since the present invention allows reservation codes to be easily used for TVs as well as VCRs, the practical value of the invention is enormous.

What is claimed is:

1. A combination television and videocassette recorder device comprising:

a television monitor;

a videocassette recorder controlled by a remote control box for receiving and recording TV programs defined by TV program reservation codes generated by said remote control box;

selector means for switching between television mode and videocassette recorder mode;

means for applying video output from said videocassette recorder to said television monitor;

means for controlling power supply to said television monitor via said videocassette recorder in accordance with said reservation codes when said selector means is set to the television mode to activate said television monitor and said videocassette recorder simultaneously for monitoring on said television monitor said TV programs received through said videocassette recorder regardless of presence of a videotape in said videocassette recorder, and means for activating said videocassette recorder in recording mode in accordance with said reservation codes when said selector means is set to the videocassette recorder mode.

2. A combination television and videocassette recorder device as set forth in claim 1, wherein said device includes means for controlling said videocassette recorder to prevent a videotape loaded therein from traveling in accordance with reservation codes when said selector means is set to the television mode.

3. A combination television and videocassette recorder device as set forth in claim 1, wherein said selector means is switched in response to encoded infrared rays emitted from said remote control box.

4. A combination television and videocassette recorder device as set forth in claim 2, wherein said selector means is switched in response to encoded infrared rays emitted from said remote control box.

5. A combination television and videocassette recorder device as set forth in claim 1, wherein said videocassette recorder, having built-in control means responsive to reservation codes and being united to said television monitor, is controlled in accordance with said reservation codes whether or not a videotape has been loaded into said videocassette recorder.

6. A combination television and videocassette recorder device as set forth in claim 2, wherein said videocassette recorder, having built-in control means responsive to reservation codes and being united to said television monitor, is controlled in accordance with said reservation codes whether or not a videotape has been loaded into said videocassette recorder.

7. A combination television and videocassette recorder device as set forth in claim 3, wherein said videocassette recorder, having built-in control means responsive to reservation codes and being united to said television monitor, is controlled in accordance with said reservation codes whether or not a videotape has been loaded into said videocassette recorder.

8. A combination television and videocassette recorder device as set forth in claim 4, wherein said videocassette recorder, having built-in control means responsive to reservation codes and being united to said television monitor, is controlled in accordance with said reservation codes whether or not a videotape has been loaded into sad videocassette recorder.

9. A combination television and videocassette recorder device as set forth in claim 1, wherein said selector means is automatically switched to the television mode when no videotapes have been loaded into said videocassette recorder.

10. A combination television and videocassette recorder device as set forth in claim 5, wherein said selector means is automatically switched to the television mode when no videotapes have been loaded into said videocassette recorder.

11. A combination television and videocassette recorder device as set forth in claim 6, wherein said selector means is automatically switched to the television mode when no videotapes have been loaded into said videocassette recorder.

12. A combination television and videocassette recorder device as set forth in claim 7, wherein said selector means s automatically switched to the television mode when no videotapes have been loaded into said videocassette recorder.

13. A combination television and videocassette recorder device as set forth in claim 8, wherein said selector means is automatically switched to the television mode when no videotapes have been loaded into said videocassette recorder.

14. A system for combining a TV set with a VCR responsive to a TV program reservation code comprising:

first means responsive to a first control signal for controlling said TV set to display an incoming video signal in accordance with said TV program reservation code, and second means responsive to a second control signal for controlling said VCR to record said incoming video signal on a video record medium of said VCR in accordance with said TV program reservation code, said TV set being united to said VCR and being activated by the same infrared signal as said VCR in accordance with said TV program reservation code to allow said incoming video signal received through a selected receiving channel of said VCR to be monitored on said TV set regardless of presence of a videotape in said VCR.

15. The system of claim 14, wherein said first and second control signals are supplied by a mode selector for selecting either a mode of displaying said incoming video signal on said TV set or a mode of recording said incoming video signal on said video record medium of said VCR.

16. The system of claim 14, wherein said incoming video signal is displayed on said TV set automatically when said video record medium is not loaded into said VCR.

17. The system of claim 14, wherein said incoming video signal is recorded on said VCR automatically when said video record medium is loaded into said VCR.

18. The system of claim 14, wherein said first control signal is supplied to prevent said video record medium in said VCR from travelling in response to said TV program reservation code.

19. A method of controlling a system combining a TV set with a VCR responsive to a TV program reservation code comprising the steps of:

activating said TV set and said VCR by the same infrared signal, in response to said TV program reservation code, displaying an incoming video signal received through said VCR on said TV set in response to said TV program reservation code regardless of presence of a videotape in said VCR when the system is set into a TV mode, and recording an incoming video signal on a video record medium of said VCR in response to said TV program reservation code when the system is set into a VCR mode.

20. The method of claim 19, wherein said incoming video signal is displayed automatically on said TV set when said video record medium is not loaded into said VCR.

21. The method of claim 19, wherein said incoming video signal is recorded on said VCR automatically when said video record medium is loaded into said VCR.

22. The method of claim 19, wherein said video record medium in said VCR is prevented from travelling in response to said TV program reservation code when the system is set into said TV mode.

* * * * *